United States Patent [19]
Hoffman et al.

[11] 4,218,743
[45] Aug. 19, 1980

[54] ADDRESS TRANSLATION APPARATUS

[75] Inventors: Roy L. Hoffman; Glen R. Mitchell, both of Pine Island; Frank G. Soltis, Rochester, all of Minn.

[73] Assignee: International Business Machines Corporation, Armonk, N.Y.

[21] Appl. No.: 925,490

[22] Filed: Jul. 17, 1978

[51] Int. Cl.² ............................................. G06F 9/20
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,781,808 | 12/1973 | Ahearn et al. | 364/200 |
| 3,854,126 | 12/1974 | Gray et al. | 364/200 |
| 3,902,164 | 8/1975 | Kelley | 364/200 |
| 3,938,096 | 2/1976 | Brown | 364/200 |
| 4,057,848 | 11/1977 | Hayashi | 364/200 |

OTHER PUBLICATIONS

"Scatter Storage Technique," Robert Morris, *Communications of the ACM*, vol. II, No. 1, Jan. 1968, pp. 38–44.

*Primary Examiner*—Gareth D. Shaw
*Assistant Examiner*—Thomas M. Heckler
*Attorney, Agent, or Firm*—Donald F. Voss

[57] ABSTRACT

Address translation apparatus is provided for translating virtual addresses to real storage addresses and real storage addresses to virtual storage addresses. The address translation apparatus uses a page directory having a next real address and an associated virtual address ordered according to real addresses. This simplifies the manner in which the input/output (I/O) handles addressing in a virtual storage computer system. When the I/O device control mechanism needs to resolve the real I/O address register, it uses the contents of that register to index into the page directory to obtain a corresponding virtual address. The corresponding virtual address is incremented and converted to a real address which is used to index into the page directory. The virtual address taken from the page directory is then compared with the virtual address which had been incremented and translated. If the two compare then the real address which had been used to access the page directory is entered into a register so as to be available as a real main storage address. In actuality it is only a partial real main storage address and is concantenated with a byte identifier portion of the main storage address which requires no translation and which was a part of the original I/O real address for main storage.

8 Claims, 3 Drawing Figures

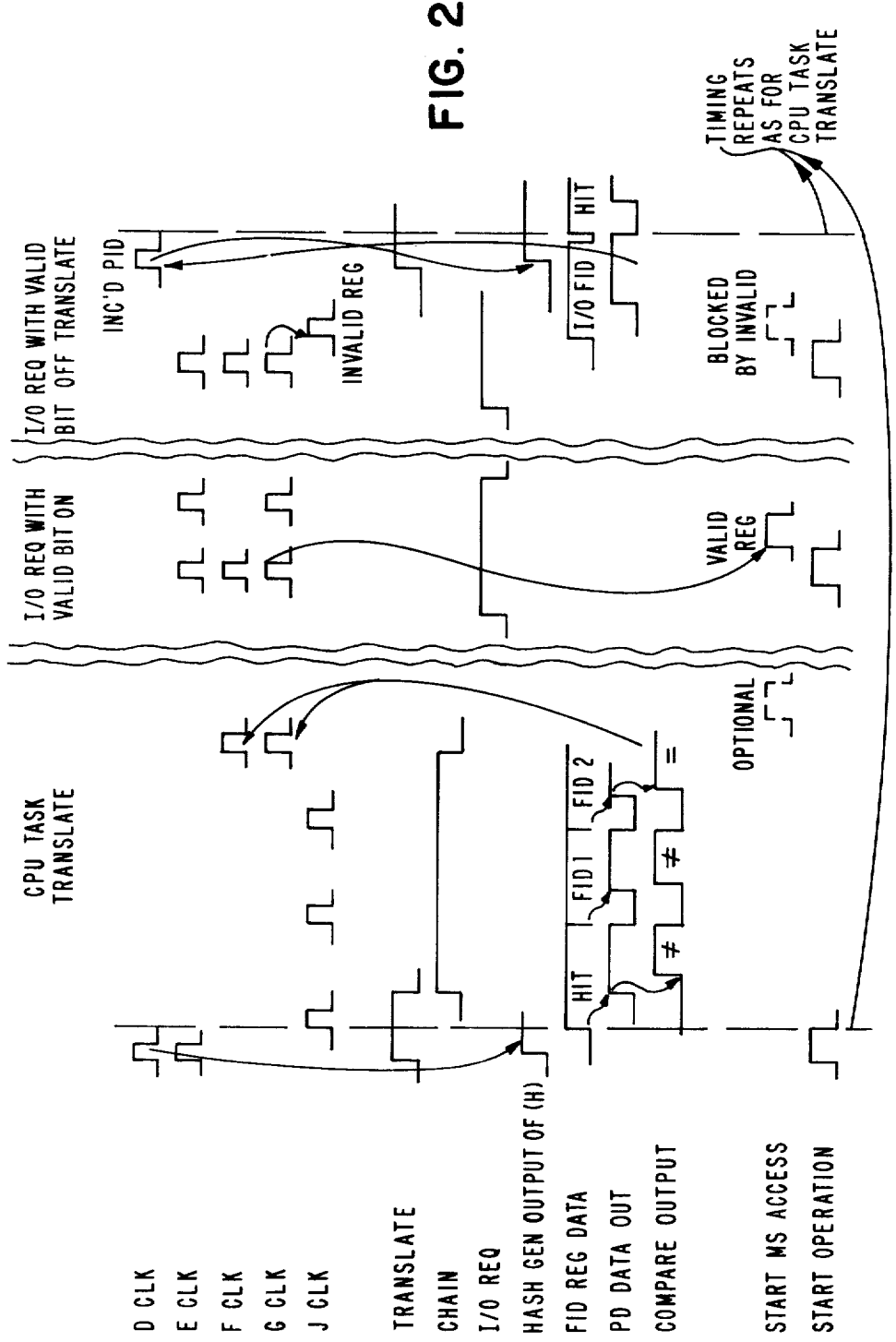

ADDRESS TRANSLATION APPARATUS

DESCRIPTION

BACKGROUND OF THE INVENTION

1. Field of the Invention

This invention relates to address translation apparatus for computer systems and, more particularly, to bi-directional address translation apparatus for translating real storage addresses into virtual storage addresses and virtual storage addresses into real storage addresses.

The invention finds particular utility in a computer system structured with virtual storage where commands to the I/O devices are issued with virtual storage addresses.

2. Description of The Prior Art

In the past it has been the practice to have the I/O device control mechanism provide the virtual address to be resolved. This required that for each I/O address register a companion virtual address register had to be maintained and incremented/decremented in synchronization with the I/O address register. The need for having two registers for each I/O address is eliminated by the present invention. A single register can be used because a real storage address can be translated to a virtual storage address which is then incremented and the incremented virtual storage address can be translated to a real storage address. This capability is facilitated by having the entries in the page directory ordered by real addresses rather than virtual addresses.

SUMMARY OF THE INVENTION

The principal objects of the invention are to provide improved address translation apparatus which (a) can translate real storage addresses to virtual storage addresses and virtual storage addresses to real storage addresses; (b) eliminates the need of two registers for each I/O address; (c) can translate virtual storage addresses for the central processing unit (CPU) and I/O devices.

The foregoing objects are achieved by having a page directory with each entry having a next real address and an associated virtual address where the entries are ordered according to real addresses. The address translation apparatus translates virtual storage addresses to real storage addresses and real storage addresses to virtual storage addresses.

The address translation apparatus performs address translation for both CPU and I/O Task operations. The CPU requires address translation when there is a lookaside buffer miss. The use of lookaside buffers for addressing is well known in the art and does not form a part of the present invention. When a lookaside buffer miss occurs it is necessary to translate a virtual storage address to a real storage address to put a real storage address into the lookaside buffer. It is also necessary to translate a real storage address to a virtual storage address to update the status of the translation entry removed from the lookaside buffer.

For I/O devices, the address in the I/O register can be invalid if it has crossed a page boundary. In the present invention, when this occurs the page frame identifier (FID) portion of the address is used to index into the page directory and the page identifier (PID) taken from the page directory is incremented and translated into a real storage address. The frame identifier of that translated real storage address accesses the page directory and the page identifier from the entry accessed in the page directory is compared to the page identifier which had been incremented. If the two page identifiers compare equal to each other, then the frame identifier associated with the incremented page identifier is the frame identifier for the translated real storage address. If the page identifier from the page directory did not compare with the incremented page identifier the associated next frame identifier taken from the entry accessed from the page directory is used to make another access into the page directory and the operation described repeats until an entry is found where the page identifier from the page directory compares equal to the incremented page identifier.

BRIEF DESCRIPTION OF THE DRAWINGS

FIG. 1-2 are a schematic logic diagram of the invention; and, FIG. 2 is a timing diagram.

DESCRIPTION

Figure 1:
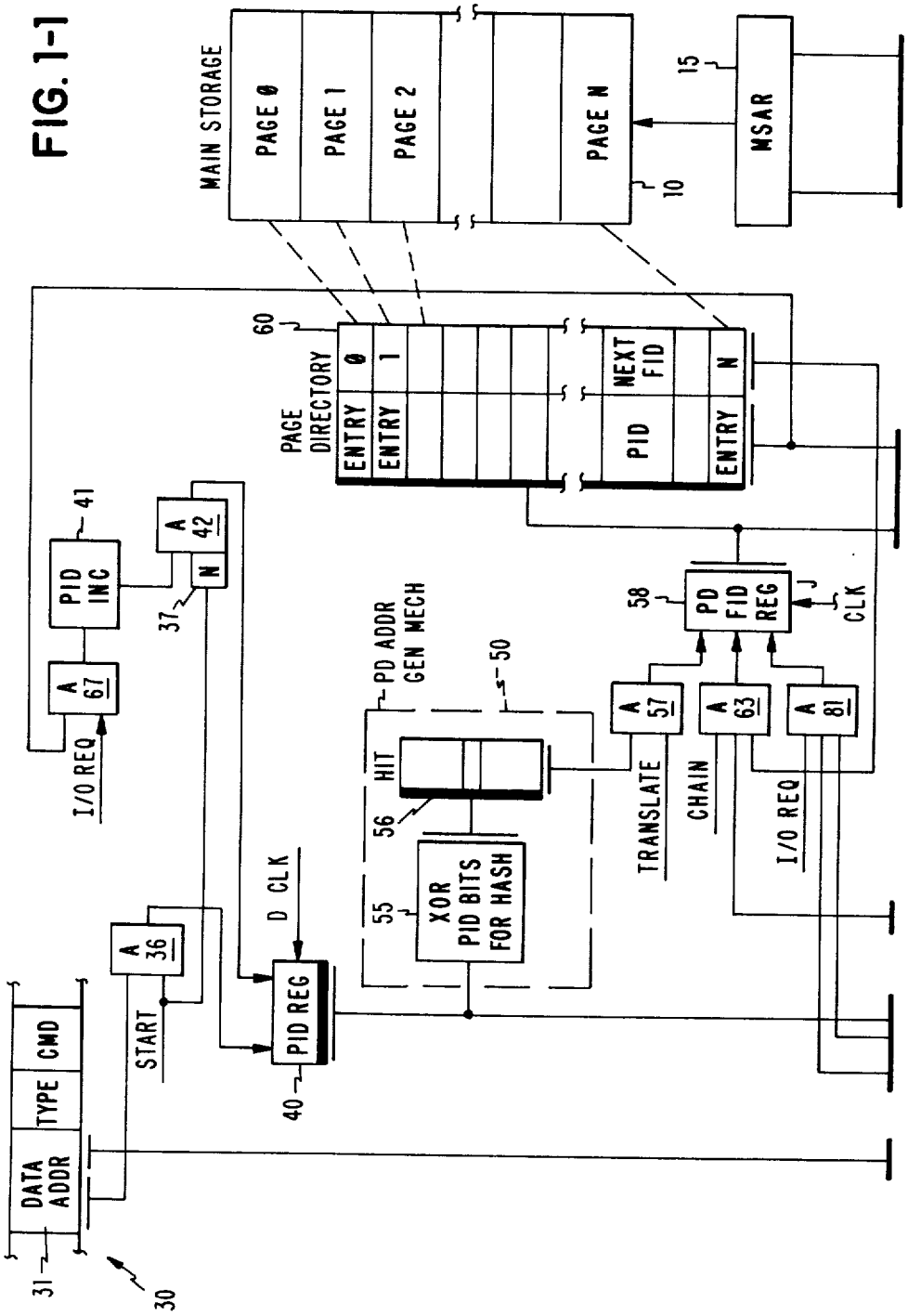
FIGS. 1-1 and 1-2, taken together with FIG. 1-1 disposed above
Figures 1, 2:
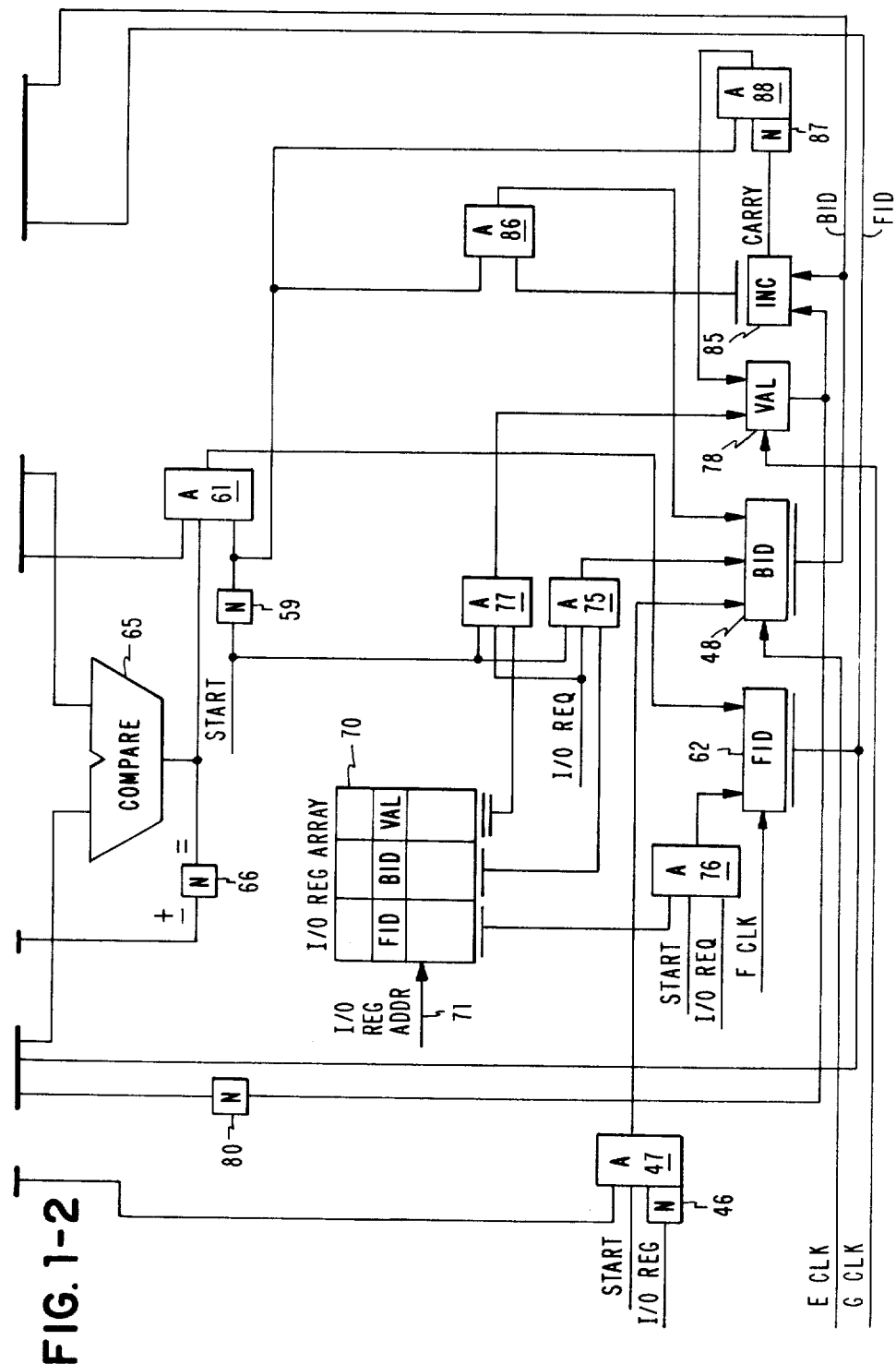

With reference to the drawings, and particularly to FIGS. 1-1 and 1-2, the invention is illustrated by way of example as being corporated in a stored program computer system having an addressable main storage 10 which is addressed by real addresses contained in main storage address register (MSAR) 15. Main storage 10 is organized into N page frames of storage locations. Pages are loaded into main storage 10 from a program's address space. Pages from a program's address space are identical in size to page frames in main storage 10. In a virtual storage system the capacity of virtual storage exceeds the capacity of real storage and in this example main storage 10. The virtual storage address is thus larger than the real storage address because it addresses a larger storage space. Consequently it is necessary to translate the virtual storage address to a real storage address.

Virtual storage is generally divided into a number of segments and each segment is divided into pages of a fixed size. Thus a virtual address has a segment identification (SID) portion, a page identification (PID) portion and a byte identification (BID) portion. In the present invention the combination of segment identification and page identification is referred to as page identifier (PID) for simplicity. Additionally, virtual addresses which are to be translated for CPU operations would utilize the present invention only if address translation could not be accomplished by use of a lookaside buffer. Thus, although the present invention can translate virtual addresses for either CPU or I/O operations, the invention is particularly useful for translating virtual addresses for I/O operations.

An I/O command 30 is schematically illustrated as containing a virtual data address 31 where a portion of that address is passed by AND circuit 36 into a register 40. A byte identifier portion of address 31 is passed via AND circuit 47 into a BID register 48. AND circuits 36 and 47 are conditioned by a Start translation signal. AND circuit 47 is additionally conditioned by the absence of an I/O request (I/O REQ) signal via inverter 46.

It should be noted that the byte identifier portion of the virtual address is the same as the byte identifier portion of the real address. Consequently the contents of register 48 are applied directly to real storage address register 15 without any translation. The contents of register 40, however, have to be translated. This is accomplished by first converting the contents of register 40 into a page directory address. The page directory address is then used to access a page directory which has virtual addresses ordered therein according to real addresses.

The contents of register 40 are, therefore, applied to page directory address generation mechanism 50 and to compare circuit 65. The page directory address generation mechanism 50 functions to convert a virtual address into a real frame identifier (FID) address. The page directory address generation mechanism 50 selects certain bits from the virtual address in register 40 to form a page directory address the size of which is dependent upon the number of frame pages in main storage 10. For example, if main storage 10 contains 16 pages then the page directory address generation mechanism would produce an address containing 4 binary bits.

The number of entries in page directory 60 correspond in number to the number of frame pages in main storage 10. The page directory address generation mechanism 50 has the characteristic that many virtual addresses produce the same frame identifier because there are more bits in the virtual address than in the frame identifier. Thus the frame identifier field of the page directory is used to connect together those page frames in main storage whose virtual addresses when passed through the page directory address generation mechanism 50·produce the same frame identifier (FID). Hence the page directory address generation mechanism 50 can be implemented in logic or, as illustrated, is implemented in exclusive OR circuits for performing a hash of the bits from register 40 to produce an address or index into hash index table 56 containing frame identifiers (FIDs). The FID entry from hash index table 56 is passed via AND circuit 57 into page directory frame identifier register 58. AND circuit 57 is conditioned by a translate (XLATE) signal.

The contents of page directory frame identifier register 58 are applied as an address or index into page directory 60 and the PID portion of the selected entry from page directory 60 is compared with the contents of register 40. If the virtual address portion of the selected entry from page directory 60 compares to the contents of register 40 then the contents of register 58 are passed by AND circuit 61 into FID register 62. The contents of register 62 are then the frame identifier portion of the real address which is entered into register 15. If the virtual address portion or PID of the selected entry does not compare with the contents of register 40, the next frame identifier (FID) portion of the entry from table 60 is passed by AND circuit 63 into register 58. AND circuit 63 is conditioned by a noncompare signal via inverter 66 and by a chain signal. The next frame identifier value in register 58 addresses page directory 60 and a new entry is selected. The operation just described then repeats until the virtual address portion of the entry compares equal to the contents of register 40 or until the end of the chain has been reached, this being an indication that none of the entries in page directory 60 correspond to the contents of register 40. When this occurs, it is necessary to replace an entry in page directory 60. The replacement of entries in page directory 60 is not part of the present invention and thus will not be described.

The virtual address (PID) portion of the selected entry from page directory 60 is also applied to incrementer 41 via AND circuit 67 which is conditioned by an I/O request (I/O REQ) signal. The output of incrementer 41 is then passed via AND circuit 42 to register 40. AND circuit 42 is conditioned by the absence of a Start signal via inverter 37.

During an I/O operation the I/O device, not shown, which requires a data transfer operation, presents an address on bus 71 to address an I/O register in I/O register array 70. Each I/O register in array 70 contains a frame identifier (FID) portion, a byte identifier portion (BID) and a valid (VAL) bit. The frame identifier portion is passed to register 62 via AND circuit 76 which is conditioned by a Start signal and an I/O request (I/O REQ) signal. The data passed by AND circuit 76 is then clocked into register 62 by a F clock signal which occurs as shown in FIG. 2. The byte identifier (BID) portion of the selected I/O register is entered into the byte identifier register 48 via AND circuit 75. Register 48 is clocked by an E clock signal occuring as shown in FIG. 2. The valid bit from the selected I/O register is entered into a one bit register 78 via AND circuit 77. AND circuits 75 and 77 are conditioned by a Start signal and an I/O request (I/O REQ) signal.

Whenever the selected I/O register has its valid bit in a zero state indicating that the real address has crossed a page boundary, the real address is converted to a virtual address which is then incremented and the incremented virtual address is then converted into a real address. The output of validity register 78 is applied to inverter 80 and its output conditions AND circuit 81 when the bit in register 78 is zero. AND circuit 81 is also conditioned by an I/O request (I/O REQ) signal and receives the real address (FID) portion or contents of register 62. The output of AND circuit 81 is applied to register 58.

The virtual address (PID) portion of the entry selected from page directory 60 by the contents of register 58, which is clocked at J clock time, is applied to compare circuit 65 and also to AND circuit 67. The virtual address portion of the selected entry is passed by AND circuit 67 to incrementer 41. AND circuit 67 is conditioned at this time by the I/O request (I/O REQ) signal. Then, when the Start signal goes away inverter 37 conditions AND circuit 42 whereby the incremented virtual address (PID) is passed into register 40. The incremented virtual address (PID) in register 40 is then translated to a page directory address (FID) by page directory address generation mechanism 50. A page directory address (FID) is passed by AND circuit 57 into register 58. AND circuit 57 is conditioned at this time by a translate (XLATE) signal.

The contents of register 58 address page directory 60 and the virtual address (PID) of the newly selected entry is compared with the contents of register 40. If there is an equal comparison the contents of register 58 are then passed by AND circuit 61 into register 62. AND circuit 61 is conditioned by the equal comparison signal and the absence of a Start signal via inverter 59.

The valid bit from register 78 is also applied to incrementer 85 for controlling the incrementing of the contents of register 48. The output of incrementer 85 is applied to AND circuit 86 and its output is applied to the input of register 48. AND circuit 86 is conditioned by the absence of a Start signal via inverter 59. The Carry output from incrementer 85 is applied to AND circuit 88 via inverter 87. AND circuit 88 is conditioned by the output of inverter 59 and the output of AND circuit 88 is applied as an input into register 78.

From the foregoing it is seen that at the start of an I/O operation the real address (FID) portion from the selected I/O register in register array 70 is passed by AND circuit 76 and entered into register 62 by an F clock signal. The byte identifier (BID) portion from the selected I/O address register is entered into register 48 via AND circuit 75. The valid bit from the selected I/O register is entered into register 78 via AND circuit 57. Further it is seen that if the valid bit were zero then the real address is translated to a virtual address and that virtual address is then incremented and the incremented virtual address is translated into a real address.

The BID portion of the real address is then incremented and in the absence of a carry, a one bit is set into validity register 78 via AND circuit 88. Hence, so long as the BID portion of the I/O real address does not cross a page boundary no address translation is required because the real address is valid. When the BID portion crosses a page boundary, incrementer 85 generates a carry signal which inhibits AND circuit 88 via inverter 87 and a zero bit is entered into register 78 which is clocked by the G clock signal.

With a zero bit in validity register 78, an address translation is performed as previously described, i.e., the content of register 62 which represent a real address are translated into a virtual address by accessing page directory 60. The virtual address (PID) retrieved from page directory 60 is then incremented by incrementer 41 and the incremented address is translated to a real address in the manner previously described.

From the foregoing it is seen that the address translation apparatus translates a virtual address by placing the same into register 40 and the page directory address generation mechanism 50 then translates the virtual address in register 40 to a real address. The real address can then be entered into register 58 via AND circuit 57 and transferred from register 58 via AND circuit 61 to register 62 so as to be available for transfer into main storage address register 15. It is also seen that a real storage address can be translated to a virtual storage address by entering the real storage address into register 58 and the translation is performed by using the real storage address in register 58 to address page directory 60 which has entries therein containing virtual addresses. Further it is seen that the present invention finds particular utility for translating real main storage addresses for I/O operations because only a single register is required.

While the preferred embodiment of the invention has been illustrated and described, it is to be understood that the invention is not to be limited to the precise construction herein disclosed and the right is reserved to all changes and modification coming within the scope of the invention as defined in the appended claims.

Having thus described the invention, what is claimed as new, and desired to be secured by Letters Patent is:

1. Address translation apparatus for translating virtual storage addresses to real storage addresses and real storage addresses to virtual storage addresses comprising:

first register means for storing virtual storage addresses,
  means for loading a virtual storage address in said first register means,
  means for translating said virtual storage address in said first register means to a translated real storage address,
  second register means for storing translated real storage addresses,
  means for loading said translated real storage address into said second register means,
  an addressable table having a number of entries corresponding to the addressing range of said translated real storage address, each entry containing a virtual storage address and an associated next real storage address, said entries being ordered according to real storage addresses,
  first gating means connected to said second register means,
  means connecting said second register means to address said addressable table,
  compare means connected to receive a virtual storage address from said addressable table and from said first register means and operable to generate equal or unequal comparison result signals based upon comparison or non-comparison of the virtual storage address from said table with the virtual storage address from said first register means,
  means for applying said equal comparison result signal to said first gating means to render the same operable to pass said translated real storage address from said second register means,
  a real storage address register connected to receive said translated real storage address passed by said first gating means,
  second gating means connected to receive a next real storage address from said addressable table and operable in response to said unequal comparison result signal to pass said next real storage address, and
  means for loading said next real storage address passed by said second gating means into said second register means.

2. The address translation apparatus of claim 1 further comprising:

an address incrementer having an input for receiving addresses to be incremented and an output for passing the incremented address,
  third gating means connected to receive a virtual storage address from said addressable table and upon being conditioned, pass said virtual storage address to said input of said address incrementer,
  means for conditioning said third gating means,
  fourth gating means connected to said output of said incrementer to receive the incremented address therefrom and upon being conditioned for passing said incremented address into said first register means, and
  means for conditioning said fourth gating means.

3. The address translation apparatus of claim 1 further comprising:

means for incrementing a portion of said translated real storage address passed by said first gating means,
  means for generating a carry signal when said portion of said translated real storage address is incremented above a predetermined value, and
  fifth gating means connected to receive said translated real storage address passed by said first gating means and connected to be conditioned by said carry signal to pass said translated real storage address into said second register means.

4. Address translation apparatus comprising:
  a virtual storage address register, a source of virtual storage addresses, each virtual storage address having a page identifier portion and a byte identifier portion, means for loading said page identifier portion of a virtual storage address in said virtual storage address register, page directory address generating means connected to said virtual storage address register for generating a page directory address from said page identifier portion of a virtual storage address, an addressable page directory connected to said page directory address generating means to be addressed by an address generated by said address generating means and having a number of entries corresponding to the addressing range of said page directory address, each entry containing a page identifier portion of a virtual storage address and an associated next real storage address, said entries being ordered according to real storage addresses, compare means connected to compare a page identifier portion of a virtual storage address from said virtual storage address register with a page identifier portion of a virtual storage address from said page directory and for generating equal and nonequal comparison signals, means responsive to an equal comparison signal for forming a real main storage address by concatenating said page directory address generated by said page directory address generating means with a byte identifier portion of a virtual storage address having its page identifier portion loaded in said virtual storage address register and, means responsive to a nonequal comparison signal for addressing said page directory with said next real address from said page directory whereby another page identifier portion of another virtual storage address from said page directory is applied to said compare means for comparing the same with said page identifier portion of said virtual storage address from said virtual storage address register.

5. The address translation apparatus of claim 4 further comprising:

means for incrementing said byte identifier portion from said virtual address having its page identifier portion in said virtual address register and providing a page crossing signal when said incremented byte identifier portion increases above a predetermined value to provide an indication that the real main storage address is invalid.

6. The address translation apparatus of claim 5 further comprising:

address incrementing means, means responsive to said page crossing signal for applying said page identifier portion of a virtual storage address read from said page directory to said address incrementing means, and means for loading said incremented page identifier portion of said virtual storage address in said virtual storage address register.

7. Address translation apparatus for a computer system having a main storage with pages of storage locations, the improvement comprising:

address register means for storing real storage addresses, means for incrementing said real storage addresses, page crossing determining means connected to said incrementing means for determining when an incremented real storage address crosses a page boundary, real to virtual storage address translation means responsive to said page crossing determining means determining that an incremented real storage address has crossed a page boundary for translating said incremented real storage address to a virtual storage address, means connected to said real to virtual storage address translation means for receiving and incrementing said virtual storage address translated from said incremented real storage address, and virtual to real address translation means connected to said incrementing means for translating the incremented virtual storage address.

8. Virtual to real storage address translation apparatus the improvement comprising:

an addressable page directory storing virtual storage addresses ordered in addressable locations according to real storage addresses, virtual storage address register for containing virtual storage addresses, virtual storage address translation means connected to said virtual storage address register for translating virtual storage addresses received from said virtual storage address register to real storage addresses, page directory addressing means for addressing said page directory with real storage addresses translated by said virtual storage address translation means, and compare means for comparing the virtual storage address at the address location in said page directory with the virtual storage address to be translated and generating a signal indicating that the translated virtual storage address is a valid real storage address when the virtual storage address at the address location in said page directory is equal to the virtual storage address being translated.

* * * * *